United States Patent [19]

Schydlo

[11] Patent Number: 4,732,328

[45] Date of Patent: Mar. 22, 1988

[54] INLET NOZZLE IN PARTICULAR FOR SWIMMING POOLS

[76] Inventor: Martin T. Schydlo, Am Obersthof 25, D-4030 Ratingen 6, Fed. Rep. of Germany

[21] Appl. No.: 902,198

[22] Filed: Aug. 29, 1986

[30] Foreign Application Priority Data

Sep. 10, 1985 [CH] Switzerland .......................... 03913/85

[51] Int. Cl.[4] .......................... B05B 1/32; B05B 1/30; B05B 15/08; F16K 5/10

[52] U.S. Cl. .................................... 239/538; 239/579; 239/587; 137/888; 137/892; 251/208; 285/266

[58] Field of Search .................... 239/587, 579, 265.35, 239/537, 538, 428.5; 285/266; 4/541, 542, 492, 490; 137/888, 891, 892; 251/208

[56] References Cited

U.S. PATENT DOCUMENTS

| | | | |
|---|---|---|---|
| 245,007 | 8/1881 | Morse | 239/587 |
| 1,863,548 | 6/1932 | Bloch . | |
| 2,196,783 | 4/1940 | Shook | 239/587 X |
| 2,197,667 | 4/1940 | Shook . | |
| 4,275,908 | 6/1981 | Elkins et al. | 285/266 X |
| 4,408,721 | 10/1983 | Cohen et al. . | |

*Primary Examiner*—Andres Kashnikow
*Assistant Examiner*—Patrick N. Burkhart
*Attorney, Agent, or Firm*—John F. A. Earley; John F. A. Earley, III

[57] ABSTRACT

The inlet nozzle suitable for swimming pools is constructed as a two-piece-spherical body. This is pivotally graduated on a seating ring and equipped with a continuous bore. One part of the spherical body is, with respect to the other, rotatable about the one axis which runs eccentrically with respect to the axis of the bore. Thereby the cross-section of the bore can be changed at the transition point between both bore sections by turning of the one part of the spherical body. Between the two parts is a gap through which air from the air pipe is introduced.

11 Claims, 4 Drawing Figures

INLET NOZZLE IN PARTICULAR FOR SWIMMING POOLS

DESCRIPTION

Figure 1:
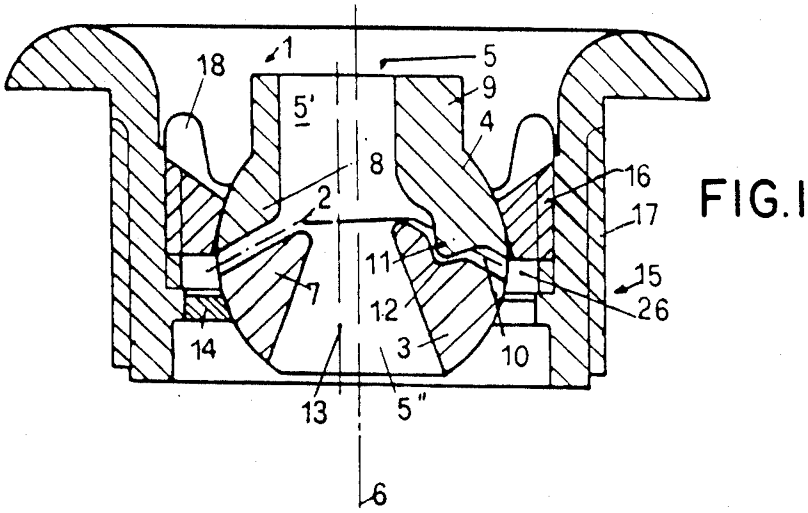
Figure 1A:
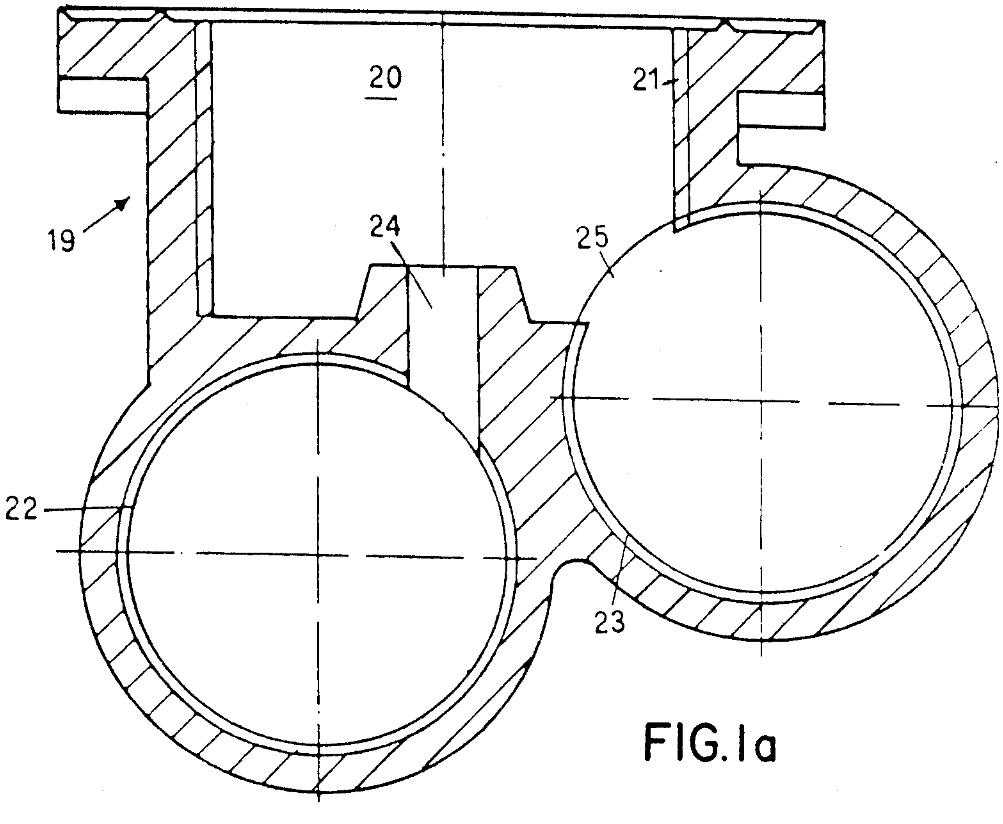

The invention concerns an inlet nozzle which is usable in particular for Swimming pools.

Inlet nozzles for water in floating baths are usually arranged in a fixed way. Especially when several inlet nozzles are arranged in one swimming pool, it is desirable to be able simply to adjust the inlet direction of the water stream, and thus to arrange the inlet nozzle to be universally adjustable for any desired application.

The quantity of water flowing out as well as the intensity of the water stream normally depends on the efficiency of the available pump and the pipe diameter. As the operating elements for the pump are normally not accessible, the intensity of the water stream in swimming pools cannot be appropriately varied by the users according to heir individual needs.

An air nozzle for air, but not for water, is known which has a throttle valve unit, more or less screwable into a basic unit, a throttle valve unit which in its final position fully shuts off the flow of air and by unscrewing it creates a valve opening area.

The known air nozzle is not usable for water since the throttle valve unit would case an undesirable turbulence in the stream of water.

The purpose of the invention is to propose an inlet nozzle in particular for swimming pools, of simple construction which permits regulation of both quantity and direction, for liquids, in particular water and additives, and for gases, in particular air.

The task is achieved thereby, in that a two-part spherical body with a first and a second part is supplied, the second part is, relative to the first part, rotatable about a first axis and the first part has a hollow space through it, just as the second part has a hollow space through it with a second axis, and that these hollow spaces are excentrically arranged with respect to the first axis, so that with the rotation of the second part the second axis turns about the first axis, while the spherical body is supported in a readily adjustable position in an inset part.

When the second part is rotated relative to the first part, the valve opening area is changed and thereby the intensity of the outcoming stream is established. The adjustment of the direction is achieved by the ability to adjust at will the overall spherical body.

The ability to freely adjust the spherical body can, according to an advantageous refinement of the invention, be accomplished thereby in an especially simple way in, that a seating ring is provided in the inset part for the purpose of supporting the first part and a ring-shaped screw means is supplied for the purpose of supporting the second part. With a very slight loosening of the ring-shaped screw means, the entire spherical body can be simply adjusted and thereby be directed. Since the ring-shaped screw means of the second part presses against the first part and this presses again on the seating ring, a relative motion of the first and second parts is possible after the loosening of the ring-shaped screw means, and thereby adjusting the intensity. By means of a single screw means the adjustment of the direction as well as of the dosage can thus be accomplished.

If desirable, admixing of air into the water stream can be done in this inlet nozzle according to the invention, and thereby an air-water mixture can be produced.

Concerning this it is proposed, in accordance with another advantageous refinement of this invention, that both spherical body parts are kept at a distance from each other in order to form a gap. Through this gap, air can flow in and be mixed with the water stream.

According to another advantageous refinement of this invention it is proposed further that the section of the hollow space of the first part which points to the gap is constructed with a conical shape. In this way, an acceleration of the water stream under pressure can be achieved in the conical section and this enforces, to the principle of a water stream pump, the air exhaustion through the gap.

According to another advantageous refinement of this invention, the surface in the spherical body separating the first part from the second part is shaped as a truncated cone. For example, the first part can be shaped as a truncated cone on its surface that lies opposite the second part and the second part is shaped correspondingly to it, e.g. like a negative to a positive picture. Thereby, an especially effective and vibration-free adjustment of the amount of water flowing through and air mixed-in can be achieved, as there are no bevelled and sharp transition points, but only a conical and a truncated conical channel is contracted and extended.

In a further advantageous design feature of this invention, the first part of the spherical body rests on a seating ring of the inset part and the second part has projects extending from the separating surface, and these projections mesh with guides, which, correspondingly, with the rotation of the second part, are built into the surface of the first part which lies opposite the second part. Thereby, a prevention of an opposite motion of both spherical bodies as well as a reliable guiding are achieved in a simple way.

According to another advantageous refinement of this invention, a connection part is provided for the purpose of connection of the inset part with the two-part spherical body which is equipped with a pressure water pipe and an air pipe. The separate connection part can in this way be optimally built in relation to the pipe connections, shape and function of the inset part with the spherical body not being affected by it.

Concerning another advantageous refinement of this invention it is proposed that the water pipe is connected with the first part of the body by a hollow space attached to the housing of the connection part, while the air pipe is connected with the gap by a through-port in the housing of the connection part and by the through-port attached to the seating ring. From it, an especially compact construction results.

The invention is described below in a more detailed way based on diagrammatic representation by way of examples, from which further advantages and features result.

Figure 2:
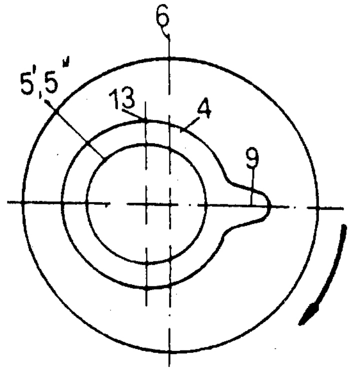
Figure 3:
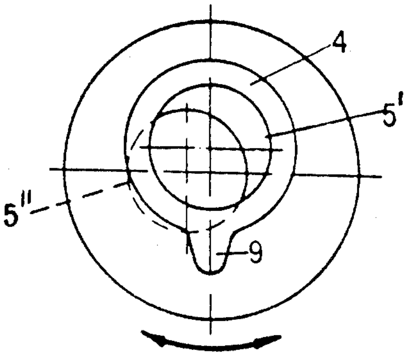
Figure 4:
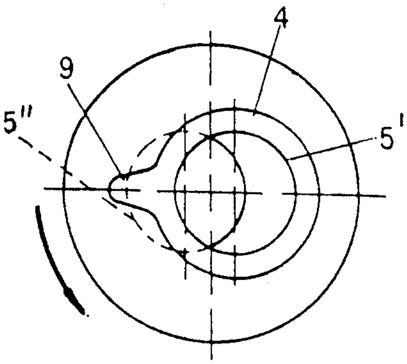

Shown in:

FIG. 1 is an inlet nozzle with connection part separately drawn in a horizontal cross-section; and FIG. 2 through 4 are three regulating positions of the spherical unit parts (in schematic representation).

The inlet nozzle, in particular for swimming pools, have spherical bodies which are constructed in two parts, in which spherical body is divided along the truncated cone-shaped formation 2 into an inlet-part 3 and an outlet-part 4. Through both spherical body parts 3, 4 a bore 5 is passed, which runs into inlet-part 3 symmetrically in relation to the central axis 6 and into outlet-part displaced with respect to this axis. The bore parts are designated 5' and 5".

As it can be seen from FIG. 1, the inlet-part 3 is constructed in hemispherical shape and in the area of the separation point is provided with a truncated-cone-shaped extension 7 which extends into the direction of the flow, whereby the part 5" of the center bore 5 is constructed reduced into the direction of flow marked by an arrow. The outlet-part 4 has a hollow shape 8 corresponding to the truncated cone-shape of the inlet-part 3 and is provided with an adjoint joint piece 9 which stands out laterally in the area of the outlet mouth of the bore 5. The middle axis 13 of the bore part 5' is dislocated parallelly with respect to axis 6 of the conical bore part 5", so that the bore part 5" runs excentrically to bore part 5'.

From FIG. 1 it can be seen further that there is a gap 10 between the two parts 3 and 4, in which both spherical body pieces 3 and 4 are kept at distance from each other. Further, the outlet-part 4 is with respect to part 3 rotatable about axis 6. The outlet-part 4 is provided with a projections 11 distributed circularly in the area of the hollow form 8, which stand out from the separation surface of both parts 3 and 4 and mesh with a correspondingly circular-shaped guide 12 which is subdivided into circular segments. The guide segments are constructed in a channelor, through-shaped profile and measure in length according to the rotation of part 4 with respect to part 3. Mostly, a rotation of 180° is desirable.

The inlet-part 3 of the spherical body 1 rests on a seating ring 14, provided in places with through ports 26, of an inset 15 which is provided with internal and external threads 16, 17. The outlet-part 4 rests, as described, on the inlet-part 3 and is secured with the help of a thump nut 18.

A connection part 19 serves, as the reception of the inset 15 together with the spherical body 1, which is equipped with a suitable recess 20 which has an internal thread 21 such that the inset 15 can be screwed up tightly into the recess 20. The connecting part 19 is provided with a water pipe 22 and with an air pipe 23, which are carried separate from each other. The water pipe 22 is connected with the bore part 5" of the inlet-part 3 through a bore 24, while the air pipe 23 is provided with a through port 25 which opens up into the gap 10.

In the formation as can be seen from FIGS. 1 and 2 the full profile on the outlet-end of the bore part 5' is in connection with the bore part 5", so that a maximum amount of water flows through the nozzle and pulls along with it the air from the pipe 23 through the gap 10. If the outlet-part 4 is rotated clock-wise 90° (FIG. 3), then only one part of the cross-sectional area of nozzle aperture of the bore part 5' still corresponds with the bore part 5", such that the flow is throttled and less water flows out of the nozzle. After a further 90° rotation (FIG. 4), the minimum cross-sectional area of nozzle aperture is reached, at which the outflowing amount of water is throttled to its maximum.

To adjust the flow direction, the spherical body 1 on the seating ring 14 is totally turned around, which is easily done with the help of the adjoint piece 9. The cross-sectional area of the nozzle aperture is not changed thereby and the outlet-conditions not affected.

It is of course possible to separate the spherical body along a surface area, such that two approximately hemispheric parts originate, which are rotatable with respect to each other and have a bore positioned parallel but displaced with respect to the axis of rotation. In such a design, the production of which is simpler and cheaper, edges originate however at the transition points, which can effect the flow in a disadvantageous way.

The described nozzle, which is adjustable in the direction and amount of flow, is very simple in construction, space-saving in design, such that it can be arranged in greater numbers in swimming pools, in order to be activated at various places with variable flow intensity. At the same time, the stream of water is enriched by air, such that an air-water mixture results.

With the nozzle according to the invention, liquid and/or gas streams can be achieved entirely as desired.

I claim:

1. An inlet nozzle for swimming pools or the like, comprising a generally spherical body including first and second parts, the second part being rotatable with respect to the first part about a first axis, and the first and second parts having respective first and second bores which are arranged eccentrically with respect to the first axis in such a way that upon rotation of the second part about the first axis the axis of the second bore rotates about the first axis, the spherical body being mounted in an insert member in such a way that the position of the body with respect to the insert member may be adjusted.

2. An inlet nozzle according to claim 1 wherein the insert member includes a seating ring for supporting the first part and a clamping ring for securing the second part, resting on the first part.

3. An inlet nozzle according to claim 1, wherein the first and second parts are held at a distance from each other in order to define a recess therebetween.

4. An inlet nozzle according to claim 3, wherein the bore of the first part is constructed conically, at least in the region thereof pointing towards the recess between the parts.

5. An inlet nozzle according to claim 1, wherein the surface separating the generally spherical body into the first part and second parts, is shaped generally like a truncated cone.

6. An inlet nozzle according to claims 1, wherein the first part of the generally spherical body rests on a seating ring of the insert member, and the second part includes projections which engage with guide means provided on the surface of the first part facing the second part, the guide means defining the rotational movement of the second part with respect to the first part.

7. An inlet nozzle according to claim 1, wherein the insert member together with the generally spherical body are adapted to be mounted to a connector having a pipe for receiving water under pressure and an air pipe.

8. An inlet nozzle as claimed in claim 7, wherein the water pipe communicates with the first part of the body via a bore formed in a wall of the connector, while the air pipe communicates with a recess defined between the parts via a port formed in a further wall of the connector and via an aperture formed in a ring which seats such generally spherical body.

9. An inlet nozzle for swimming pools or the like, comprising a generally spherical body including first and second parts, the second part being rotatable with respect to the first part about a first axis, and the first and second parts having respective first and second bores which are arranged eccentrically with respect to the first axis in such a way that upon rotation of the second part about the first axis the axis of the second bore rotates about the first axis, the spherical body being mounted in an insert member in such a way that the position of the body with respect to the insert member may be adjusted, wherein the insert member includes a seating ring for supporting the first part and a clamping ring for securing the second part, resting on the first part, wherein the first and second parts are held at a distance from each other in order to define a recess therebetween, wherein the bore of the first part is constructed conically, at least in the region thereof pointing towards the recess between the parts.

wherein the surface separating the generally spherical body into the first part and second parts, is shaped generally like a truncated cone, wherein the first part of the generally spherical body rests on the seating ring of the insert member, and the second part includes projections which engage with guide means provided on the surface of the first part facing the second part, the guide means defining the rotational movement of the second part with respect to the first part, wherein the insert member together with the generally spherical body are adapted to be mounted to a connector having a pipe for receiving water under pressure and an air pipe, wherein the water pipe communicates with the first part of the body via a bore formed in a wall of the connector, while the air pipe communicates with the recess defined between the parts via a port formed in a further wall of the connector and via an aperture formed in the ring which seats such generally spherical body.

10. An inlet nozzle for swimming pools or the like, comprising an insert member, and a generally spherical body adjustably mounted in the insert member, the body having a first part and a second part, the body second part being rotatable with respect to the body first part about a first axis, the body first part having a bore arranged eccentrically with respect to the first axis, the body second part having a bore arranged eccentrically with respect to the first axis, and the bore in the body second part having a central axis that rotates about the first axis upon rotation of the body second part about the first axis.

11. An inlet nozzle for swimming pools or the like, comprising an insert member, and a generally spherical body adjustably mounted in the insert member, the body having a first part and a second part, the body second part being rotatable with respect to the body first part about a first axis, the body first part having a bore arranged eccentrically with respect to the first axis, the body second part having a bore arranged eccentrically with respect to the first axis, and the bore in the body second part having a central axis that rotates about the first axis upon rotation of the body second part about the first axis, the insert member having a seating ring for supporting the body and a clamping ring for securing the body against the seating ring, the first and second body parts being held at a distance from each other in order to define a recess therebetween, the bore of the first body part being constructed conically, at least in the region thereof pointing towards the recess between the first and second body parts, the surface separating the body into the first and second body parts being shaped generally like a truncated cone, the body first part resting on the seating ring of the insert member, the body second part including projections which engage with guide means provided on the surface of the body first part facing the body second part for guiding the projections and the body second part in rotational movement with respect to the body first part, the insert member being mounted on a connector having a pipe for receiving water under pressure and an air pipe, the connector having a bore connecting the water pipe to the body first part, and the connector having a port connecting the air pipe to the recess between the first and second body parts via an aperture in the seating ring of the insert member.

* * * * *